United States Patent [19]

Tarr et al.

[11] Patent Number: 5,534,161
[45] Date of Patent: Jul. 9, 1996

[54] AUTOMATIC WATER DRAIN AND PRIMING PUMP FOR FUEL SYSTEMS

[75] Inventors: Yul J. Tarr; C. Edward Morris; Glen T. Haegele, all of Columbus, Ind.

[73] Assignee: Cummins Engine Company, Inc., Columbus, Ind.

[21] Appl. No.: 358,026

[22] Filed: Dec. 16, 1994

[51] Int. Cl.$^6$ .................................................. B01D 36/00
[52] U.S. Cl. ........................... 210/744; 210/114; 210/117; 210/136; 210/138; 210/143; 210/313; 210/416.4; 210/533; 210/803
[58] Field of Search ..................... 210/114, 117, 210/312, 313, 416.4, 533, 744, 803, 138, 136; 137/172, 173; 123/516, 517

[56] References Cited

U.S. PATENT DOCUMENTS

| | | | |
|---|---|---|---|
| 4,539,109 | 9/1985 | Davis | 210/104 |
| 4,562,431 | 12/1985 | Jahnke et al. | 340/604 |
| 4,637,351 | 1/1987 | Pakula | 123/25 |
| 4,706,636 | 11/1987 | Davis | 123/516 |
| 5,053,120 | 10/1991 | Mollmann | 210/86 |

FOREIGN PATENT DOCUMENTS

WO93/01874  2/1993  WIPO ................. 210/416.4

*Primary Examiner*—Matthew O. Savage
*Attorney, Agent, or Firm*—Woodard, Emhardt, Naughton, Moriarity & McNett

[57] ABSTRACT

An automatic water drain and priming pump for a fuel system in which a reversible pump is operable in a first direction to pump separated water out of a fuel filter and into a water drain, and further operable in a second (opposite) direction to pump fuel into the fuel filter in order to prime the fuel pump. Operation of the pump in the first direction to drain water from the fuel filter is initiated by water-in-fuel sensors within the fuel filter. Operation of the pump in the second direction to prime the fuel pump is initiated by manual activation of a switch during servicing of the fuel filter.

16 Claims, 3 Drawing Sheets

5,534,161

AUTOMATIC WATER DRAIN AND PRIMING PUMP FOR FUEL SYSTEMS

TECHNICAL FIELD OF THE INVENTION

The present invention relates in general to automotive fuel systems, and more particularly to automatic water drain and printing pumps for fuel systems.

BACKGROUND OF THE INVENTION

The use of water separators in diesel engine fuel filters is a well-known expedient to rid the fuel of contaminants that might cause a malfunction of the engine. Many of these consist merely of a water drainage reservoir at the bottom of the fuel filter connected by a drain tube which expels the water to the ground. Concern over such cavalier discharge of contaminated fluids into the environment has led to the design of water separators that collect the separated water in a container located at the bottom of the filter assembly. Such containment of the separated water requires that the driver of the vehicle periodically empty the separated water from the container prior to the container becoming full. A problem arises, however, in that the driver cannot always be relied upon to remember to empty the separated water when required. To overcome this problem, some water separators contain sensors which are activated when the water reaches a predetermined level in the reservoir, thereby energizing a signal light located on the dashboard of the vehicle which warns the driver of the need to drain the filter. However, such signals still require that the driver stop the vehicle and manually empty the separated water from the filter unit. This represents a considerable inconvenience to the driver, and there is still no guarantee that the driver will not simply ignore the warning light on the dashboard.

A further problem with automotive fuel filters is that after a period of time, the filter element becomes clogged with the contaminants that have been filtered from the fuel and must be replaced. The fuel within the fuel filter canister is typically drained during the filter element replacement operation and manual printing of the fuel pump is thereafter required in order to restore the fuel system to a functional state. The need to prime the fuel pump after replacement of the fuel filter adds extra service time to the fuel filter replacement operation and is an inconvenience to the service technician.

There is therefore a need for a fuel system that provides for an automatic draining of water separated from the fuel in the fuel filter when such separated water reaches a predetermined level. There is also a need for a fuel system that allows for semi-automatic printing of the fuel pump after the fuel filter element has been replaced. The present invention is directed toward meeting these needs.

SUMMARY OF THE INVENTION

The present invention relates to an automatic water drain and printing pump for a fuel system in which a reversible pump is operable in a first direction to pump separated water out of a fuel filter and into a water drain, and further operable in a second (opposite) direction to pump fuel into the fuel filter in order to prime the fuel pump. Operation of the pump in the first direction to drain water from the fuel filter is initiated by water-in-fuel sensors within the fuel filter. Operation of the pump in the second direction to prime the fuel pump is initiated by manual activation of a switch during servicing of the fuel filter.

In one form of the invention an automatic water drain and printing pump for fuel systems is disclosed, comprising: a reversible pump having first and second flow ports and operable to pump fluid in a first direction from the first flow port to the second flow port and further operable to pump fluid in a second direction from the second flow port to the first flow port; a fuel/water separator coupled to the first flow port; a water drain coupled to the second flow port; and a fuel supply coupled to the second flow port; wherein the pump is operable in the first direction to pump water from the fuel/water separator to the water drain, and operable in the second direction to pump fuel from the fuel supply to the fuel/water separator.

In another form of the invention an automatic water drain and printing pump for fuel systems is disclosed, comprising: a fuel filter; and a reversible pump coupled to the fuel filter and operable to pump water from the fuel filter when operated in a first flow direction and further operable to pump fuel into the fuel filter when operated in a second flow direction.

In another form of the invention a method of draining water and printing fuel in a fuel system is disclosed, comprising the steps of: (a) activating a pump in a first flow direction to drain water from a fuel/water separator; and (b) activating the pump in a second flow direction to prime the fuel/water separator with fuel.

DESCRIPTION OF THE PREFERRED EMBODIMENT

Figure 1:
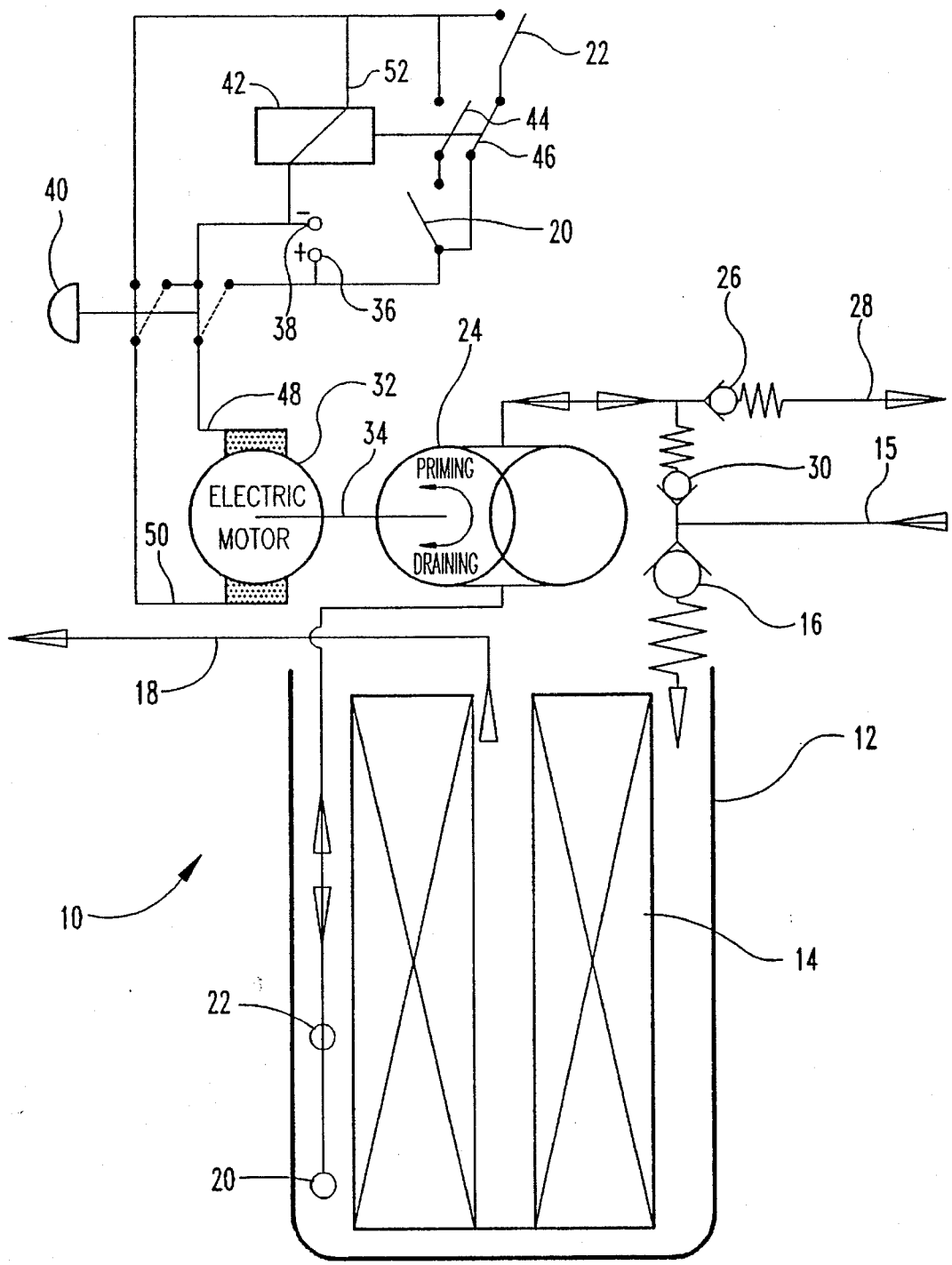
FIG. 1 is a schematic diagram of a first embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, a first embodiment of the present invention automatic water drain and printing pump for a fuel system is illustrated schematically and indicated generally at 10. The system 10 includes a fuel filter 12 which may be, for example, of the common canister configuration and having an annular filter element 14 positioned therein. Fuel from the vehicle fuel tank enters the fuel filter 12 through fuel conduit 15 and fuel inlet valve 16. Fuel inlet valve 16 is preferably a check valve which prevents fluid flow from the fuel filter 12 to the fuel conduit 15. Fuel enters the fuel filter 12 into the space defined between the filter element 14 and the sidewalls of the filter 12. The fuel then is drawn through the filter element 14 by means of a fuel pump (not shown) which suctions fuel from the interior of the filter element 14 into the fuel pump conduit 18. As the fuel passes from the outside to the inside of the filter element 14, particulate contaminants within the fuel are captured by the filter element 14, thereby purifying the fuel before it is pumped to the engine.

During the filtering process, any water that is fixed with the fuel tends to separate from the fuel and settle to the bottom of the fuel filter canister 12. Such separation and settling naturally occurs due to the fact that water has a higher specific gravity than does diesel fuel. As the volume of such separated water increases, it eventually becomes necessary to purge the separated water from the fuel filter 12. In order to determine when this is necessary, the fuel filter 12 included two water-in-fuel (WIF) sensors 20 and 22. WIF sensor 20 is positioned near the bottom of the fuel filter 12 canister and represents a minimum level of separated water. WIF sensor 22 is positioned at a level corresponding to the maximum allowable separated water level. After the water level has reached WIF maximum sensor 22, it is desirable to purge the separated water from the fuel filter 12 until the water level falls below the WIF minimum sensor 20. WIF sensors 20 and 22 each preferably consist of two spaced apart electrical contacts. The non-conductive diesel fuel will not allow current to flow between the contacts, however current will flow once the separated water level covers both contacts of either sensor 20 or 22.

Water is purged from the fuel filter 12 by means of a reversible pump 24. Pump 24 may be, for example, a positive displacement pump, such as a gear or piston pump, or some other type of self-priming pump. One side of the reversible pump 24 is coupled to the fuel filter 12 such that it is in contact with fluid at the bottom of the fuel filter 12 canister. The other end of the pump 24 is coupled to a water drain via a water drain valve 26 and a water drain conduit 28. The water drain valve 26 is, for example, a check valve that allows fluid flow from the pump 24 to the water drain conduit 28, but does not allow flow in the reverse direction. The water drain conduit 28 may be connected to any destination to which it is desired to pump the separated water. The second side of the reversible pump 24 is additionally coupled to the fuel tank conduit 15 via a printing valve 30. The priming valve 30 allows flow of fuel from the fuel tank conduit 15 to the pump 24, but prevents flow of liquid in the opposite direction. The priming valve 30 may be, for example, a check valve.

In operation, when the separated water level exceeds the position of the WIF maximum sensor 22, the pump 24 is operated in a direction which causes water to be suctioned out of the fuel filter 12. Such water exits the pump 24 and flows into water drain conduit 28 through the water drain valve 26. The printing valve 30 prevents flow of the suctioned water into the fuel tank conduit 15. Once the level of separated water has been reduced within the fuel filter 12 to below the WIF minimum sensor 20, the pump 24 is deactivated. In this way, the separated water within the fuel filter 12 is automatically purged whenever it is necessary to do so, and the purging operation is automatically halted when the separated water level reaches a desired minimum level. It will be appreciated by those skilled in the art that the purging operation may be deactivated after a predetermined time period, rather than based upon a sensed water level flowing below a predetermined point.

Reversible pump 24 may serve the additional purpose of printing the fuel filter 12 after replacement of the filter element 14. Once a new filter element 14 has been inserted into the fuel filter 12, it is necessary to prime the fuel filter 12 so that the fuel pump may draw fuel through the fuel pump conduit 18. Such printing is conveniently accomplished by reversing the direction of the pump 24. Such reversal of pump flow direction is accomplished by reversing the direction of the electric motor 32 which is coupled to the pump 24 via the drive shaft 34. When the pump 24 is operated in a reverse direction, it draws fuel from the fuel tank via fuel tank conduit 15 and priming valve 30 and pumps this fuel into the interior of fuel filter 12. The water drain valve 26 prevents water from the water drain conduit 28 from entering the pump 24 during this operation. The pump 24 can be operated for a time period sufficient to supply enough fuel to fuel filter 12 for printing purposes.

The system 10 further includes an electronic control circuit which is operative to control the reversible pump 24. The control circuit includes a terminal 36 for connection to a positive supply voltage and a terminal 38 for connection to ground. During the automatic water drain operation, the printing pushbutton 40 maintains its contacts in the left hand position. Use of the printing pushbutton 40 is described in further detail hereinbelow. The control circuit further includes a relay 42 (or other equivalent device) which has a first input coupled to the ground terminal 38. Terminal 48 of the electric motor 32 is also coupled to the ground terminal 38. The positive potential applied at terminal 36 may be coupled to a second input 52 of the relay 42 through either the WIF minimum sensor switch 20 or the WIF maximum sensor switch 22. When the separated water level is below the level of the WIF minimum sensor 20, both of the switches 20 and 22 are open and the relay 42 is de-energized, as shown in FIG. 1. The relay 42 includes a bias mechanism which forces the double contacts 44 and 46 to their right hand position when the relay 42 is de-energized.

Figure 2A:
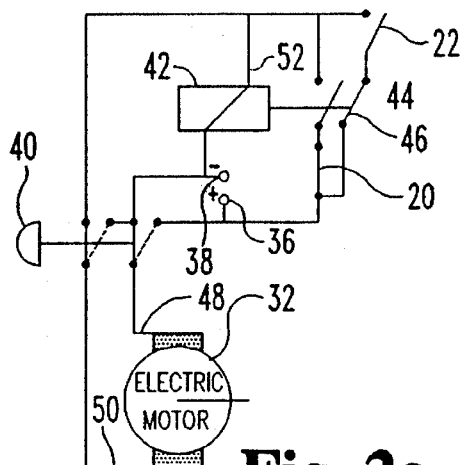
FIG. 2a–f are schematic diagrams which sequentially illustrate the operation of a control circuit of the first embodiment of the present invention.

Referring now to FIG. 2a, as the separated water level begins to rise within the fuel filter 12, it eventually surpasses the level of WIF minimum sensor switch 20 and the WIF minimum sensor switch 20 closes. At this point nothing happens in the control circuit and the electric motor 32, and hence the pump 24, remains off due to the fact that there is no connection between the positive supply terminal 36 and terminal 50 of the electric motor. Referring now to FIG. 2b, as the separated water level continues to rise and eventually reaches the WIF maximum sensor 22, the WIF maximum sensor switch 22 closes, thereby completing a circuit between the positive supply voltage terminal 36 and the terminal 50 of the electric motor 32. At this point, the electric motor 32 begins to rotate in a direction which causes the reversible pump 24 to begin purging water from within the filter 12. The closure of WIF maximum sensor switch 22 also operates to apply the positive supply voltage to the terminal 52 of relay 42. This causes the relay 42 to activate, thereby pulling the contacts 44 and 46 to the left hand position, as shown in FIG. 2c. The relay 42 is of a make-before-break configuration, such that the contact 44 closes before the contact 46 is opened. Therefore, the positive supply voltage at terminal 36 continues to be applied to terminal 52 of the relay 42 as well as terminal 50 of the electric motor 32, through the WIF minimum sensor switch 20.

Figure 2D:
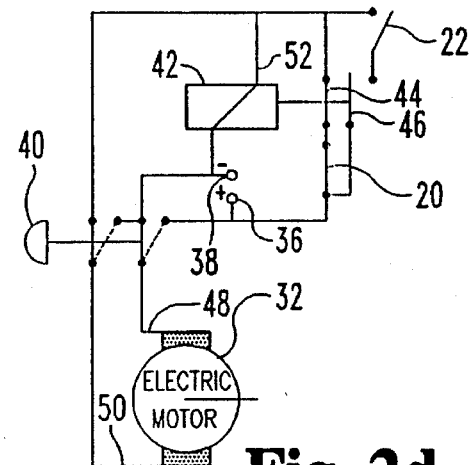
Figure 2B:
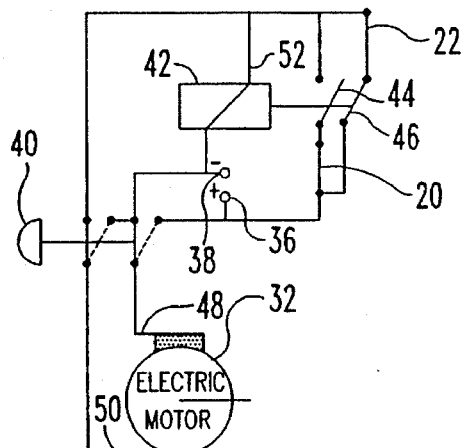
Figure 2E:
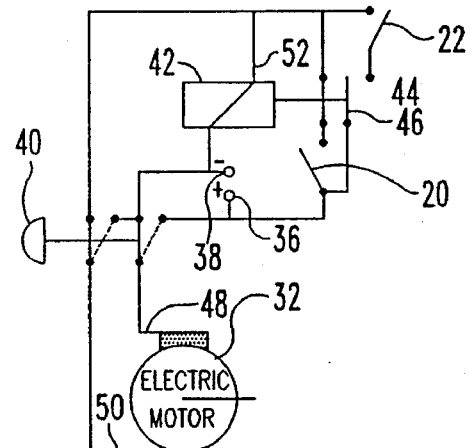
Figure 2C:
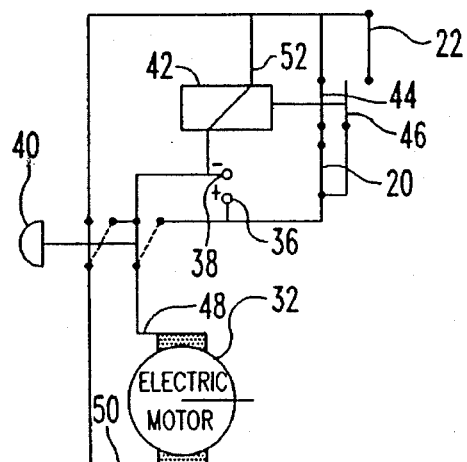
Figure 2F:
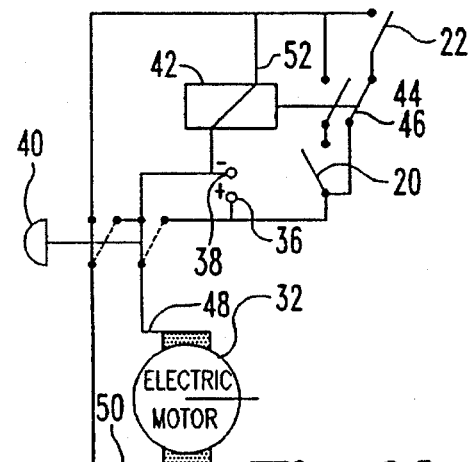

Referring to FIG. 2d, when the water level falls below the WIF maximum sensor 22, sensor 22 opens. This has no effect, however, because the positive supply voltage at terminal 36 is still applied to the relay 42 and the electric motor 32 through WIF minimum sensor switch 20. As the pump 24 continues to purge the separated water from within fuel filter 12, the water level eventually falls below the level of WIF minimum sensor 20. At this point, the WIF minimum sensor switch 20 opens, thereby de-energizing both the relay 42 and the electric motor 32, as shown in FIG. 2e. The de-energization of the electric motor 32 causes the pump 24 to cease operation. Finally, as shown in FIG. 2f, the de-energization of the relay 42 causes the dual contacts 44 and 46 to be biased to the right hand position. At this point the water level in the fuel filter 12 is at the desired minimum level and the control circuit has returned to its original configuration.

In order to operate the pump 24 in the reverse direction and thereby prime the fuel filter 12, the printing pushbutton 40 is depressed by the service technician (or by the driver if the switch 40 is remotely located on the dashboard), thereby moving its dual contacts to their right hand position. This couples terminal 50 of electric motor 32 to the ground terminal 38, and further couples terminal 48 of the electric motor 32 to the positive supply voltage terminal 36. Such an application of power to the electric motor 32 causes it to rotate in the reverse direction, thereby running the pump 24 in the reverse flow direction. This causes fuel to be withdrawn from fuel tank conduit 15 through priming valve 30 and pumped into the fuel filter 12. Once the appropriate level of priming fuel has been pumped into the fuel filter 12, the operator releases the priming pushbutton 40 and the dual contacts of the pushbutton 40 returned to their left hand position by means of a biasing force built into the pushbutton 40.

Figure 3:
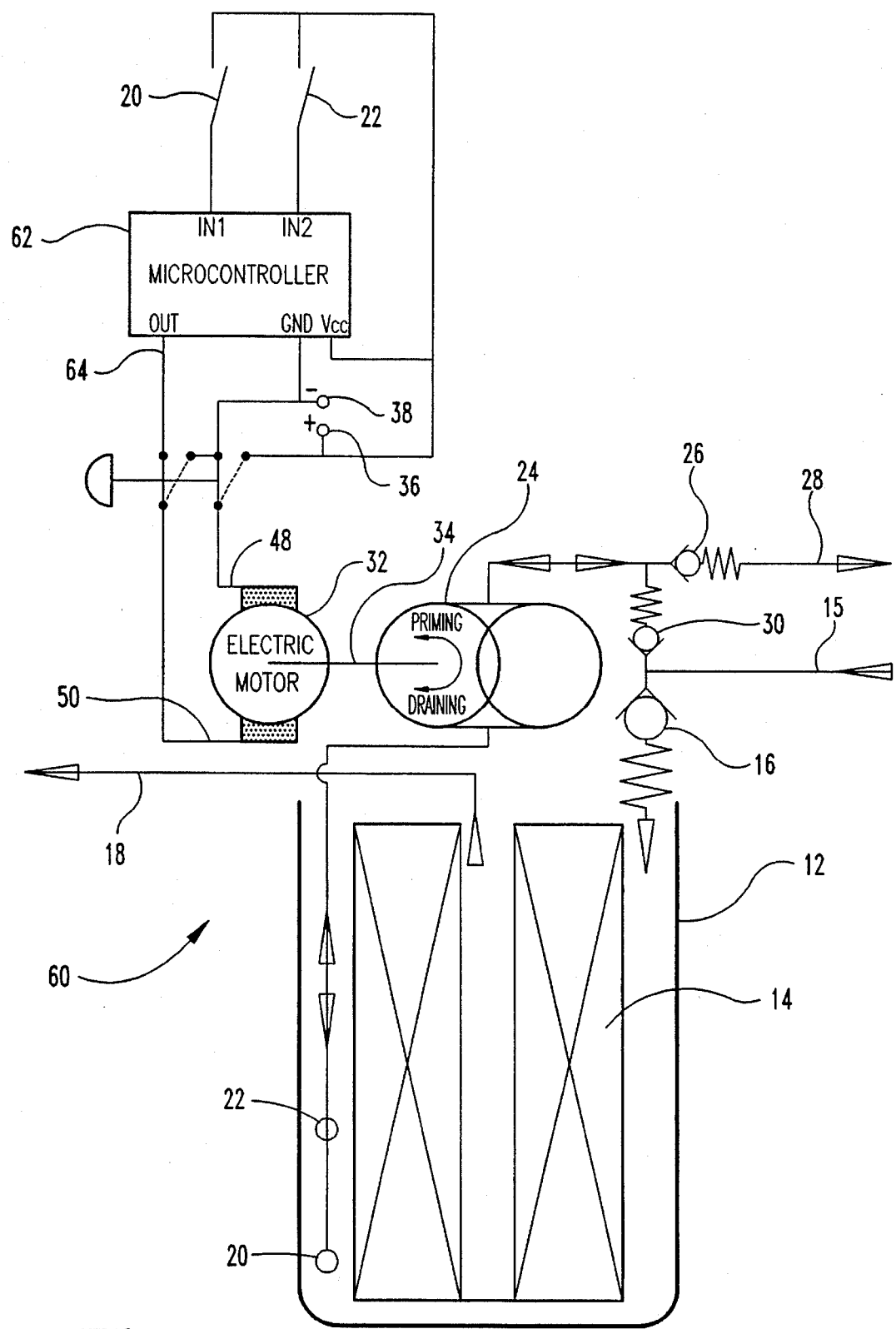
FIG. 3 is a schematic diagram of a second embodiment of the present invention.

It will be appreciated by those skilled in the art that the operation of the present invention may be controlled by any number of different control devices. Consequently, the present invention comprehends the use of any suitable control device which produces the operation of the water drain and priming pump of the present invention as disclosed hereby. One such alternative control configuration is incorporated into a second embodiment of the present invention and illustrated in FIG. 3. The fuel system 60 illustrated in FIG. 3 is substantially the same as the fuel system 10 illustrated in FIG. 1, with the exception that the control circuit based upon relay 42 has been replaced with a control circuit based upon a microcontroller 62. Microcontroller 62 may be any suitable processing device and will typically include an associated memory storage device for storage of a control program. The processing device and associated memory may be formed on the same integrated circuit chip or may be composed of discrete devices, as is known in the art. The microcontroller 62 is provided with power by connection to positive potential terminal 36 and ground terminal 38. Microcontroller 62 contains two input terminals IN1 and IN2. The WIF maximum sensor switch 22 is coupled between the positive power supply terminal 36 and the microcontroller 62 input IN1. Likewise, the WIF miniature sensor switch 20 is coupled between the positive voltage supply terminal 36 and microcontroller 62 input IN2. Microcontroller 62 further includes an output port 64 which is coupled to terminal 50 of the electric motor 32.

In operation, the microcontroller 62 sequentially executes a control program which is stored in its associated memory. The control program continuously monitors the input ports IN1 and IN2 in order to determine whether the WIF minimum sensor switch 20 or the WIF maximum sensor switch 22 are opened or closed. Unless both of the switches 20 and 22 are closed, the microcontroller 62 maintains its output port 64 in a de-energized state, thereby causing electric motor 32 to remain off. Once both of the switches 20 and 22 have closed, indicating that the separated water level is higher than the WIF maximum sensor 22, the output port 64 is energized, thereby activating electric motor 32 and pump 24. As the pump 24 continues to drain water from the fuel filter 12, the water level will recede below WIF maximum sensor 22, thereby causing the switch 22 to open. When the water level this below WIF minimum sensor 20, the switch 20 will also open. At the point when both the switches 20 and 22 are open, the microcontroller 62 de-energizes its output 64, thereby turning off electric motor 32 and pump 24. This completes the water drain cycle of fuel filter 12. Alternatively, upon activation of the pump 24, the microcontroller 62 can simply maintain its output port 64 in an energized state for a predetermined period of time. This predetermined period of time is calculated to allow the pump 24 to remove the required amount of separated water front the fuel filter 12. After the elapse 4 the predetermined time period, the microcontroller 62 de-energizes the output 64, thereby disabling electric motor 32 and pump 24. The operation of the priming pushbutton 40 in the fuel system 60 of FIG. 3 is identical to the operation of the equivalent switch in the fuel system 10 of FIG. 1.

The microcontroller 62 can also be used to provide diagnostic information to the engine electronic control module (ECM, not shown). For instance, the microcontroller 62 can signal the ECM when it is purging water so that the ECM can track purging frequency. The microcontroller 62 can also provide self-diagnostic features and fault code information, such as unrealistic sensor positions (E.G., WIF maximum=ON, WIF minimum=OFF), excessive current to the electric motor 32, unrealistically long purging or printing times, etc. In the simplest form, the microcontroller 62 might turn on a light on the vehicle dashboard to alert the driver that the system is automatically purging water.

It will be appreciated by those skilled in the art that the fuel system of the present invention provides numerous advantages over prior art fuel systems. The fuel system of the present invention automatically senses when there is a need to remove separated water from the fuel filter 12 and automatically initiates such a removal process. The use of the reversible pump 24 allows the separated water to be removed from the filter 12 and placed into the water drain conduit 28, which may be routed to any desired disposal site. The control system coupled to the water drain pump ensures that the desired amount of water is removed from the fuel system 12 automatically. There is no requirement that the driver or other service technician be responsible for such water removal, because such removal takes place automatically, even while the vehicle is in operation. There is therefore no danger from the fuel in fuel pump conduit 18 being contaminated with excess water from the fuel filter 12 because the separated water was not removed at the proper time. The inclusion of the reversible pump 24 in the fuel system of the present invention allows for the further advantage of providing for automatic delivery of fuel to the fuel filter 12 canister when the printing pushbutton 40 is depressed. This greatly simplifies the priming of the fuel pump after replacement of the fuel filter element 14. The combination of these features into the fuel system of the present invention represent a significant improvement over prior art fuel systems.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention arc desired to be protected.

What is claimed is:

1. An automatic water drain and priming pump for fuel systems, comprising:

a reversible pump having first and second flow ports and operable to pump fluid in a first direction from the first flow port to the second flow port and further operable to pump fluid in a second direction from the second flow port to the first flow port;

a fuel/water separator coupled to the first flow port;

a water drain coupled to the second flow port; and a fuel supply coupled to the second flow port;

wherein the pump is operable in the first direction to pump water from the fuel/water separator to the water drain, and operable in the second direction to pump fuel from the fuel supply to the fuel/water separator; and a first one-way valve coupled between the water drain and the second flow port and operable to allow fluid flow from the second flow port to the water drain and to prevent fluid flow from the water drain to the second flow port; and a second one-way valve coupled between the fuel supply and the second flow port and operable to allow fluid flow from the fuel supply to the second flow port and to prevent fluid flow from the second flow port to the fuel supply.

2. The automatic water drain and priming pump of claim 1, wherein the reversible pump comprises a positive displacement pump.

3. The automatic water drain and priming pump of claim 1, wherein the fuel/water separator comprises a fuel filter.

4. The automatic water drain and priming pump of claim 1, further comprising:

a first water level sensor positioned within the fuel/water separator and operative to indicate when a water level within the fuel/water separator exceeds a first predetermined level.

5. The automatic water drain and priming pump of claim 4, further comprising:

a controller coupled to the pump and to the first water level sensor, the controller operative to activate the pump in the first direction when the first water level sensor indicates that the water level exceeds the first predetermined level.

6. The automatic water drain and priming pump of claim 5, wherein the controller comprises a microprocessor.

7. The automatic water drain and priming pump of claim 5, further comprising:

a second water level sensor coupled to the controller and positioned within the fuel/water separator and operative to indicate when the water level within the fuel/water separator exceeds a second predetermined level, the second predetermined level being lower than the first predetermined level;

wherein the controller is operative to deactivate the pump when the second water level sensor indicates that the water level does not exceed the second predetermined level.

8. The automatic water drain and priming pump of claim 5, wherein the controller is further operable to deactivate the pump after a predetermined time period.

9. The automatic water drain and priming pump of claim 5, further including:

a manually activated switch coupled to the controller, wherein the controller is operative to activate the pump in the second direction when the switch is in a first position.

10. An automatic water drain and priming pump for fuel systems comprising:

a fuel filter;

a reversible pump coupled to the fuel filter and operable to pump water from the fuel filter when operated in a first flow direction and further operable to pump fuel into the fuel filter when operated in a second flow direction; and a controller coupled to the pump and operable to sense first and second predetermined levels and further operable to activate the pump in the first flow direction when water in the fuel filter exceeds the first predetermined level and to deactivate the pump when the water is below the second determined level.

11. The automatic water drain and priming pump of claim 10, further comprising:

a first sensor coupled to the controller and operative to indicate when the water exceeds the first predetermined level; and a second sensor coupled to the controller and operative to indicate when the water exceeds the second predetermined level.

12. A method of draining water and priming fuel in a fuel system, comprising the steps of:

(a) activating a pump coupled to a fuel/water separator in a first flow direction to drain water from the fuel/water separator; and (b) activating the pump in a second flow direction to prime the fuel/water separator with fuel.

13. The method of claim 12 wherein step (a) further comprises:

(a.1) sensing when a water level within the fuel/water separator exceeds a first predetermined level; and (a.2) activating the pump in the first flow direction to drain water from the fuel/water separator in response to sensing that the water level has exceeded the first predetermined level.

14. The method of claim 13, further comprising the steps of:

(c) sensing when the water level with the fuel/water separator is below a second predetermined level; and (d) deactivating the pump when it is pumping in the first flow direction in response to sensing that the water level has fallen below the second predetermined level.

15. The method of claim 13, further comprising the step of:

(c) deactivating the pump when it is pumping in the first flow direction after a first predetermined time period after step (a.2).

16. The method of claim 12 wherein step (b) is performed in response to manual activation of a switch operatively coupled to the pump.

* * * * *

UNITED STATES PATENT AND TRADEMARK OFFICE
CERTIFICATE OF CORRECTION

PATENT NO. : 5,534,161
DATED : July 9, 1996
INVENTOR(S) : Tarr et al.

It is certified that error appears in the above-indentified patent and that said Letters Patent is hereby corrected as shown below:

In column 1, lines 8, 41, 51, and 58, please change "printing" to priming--.

In column 2, lines 2, 15, 22 and 53, please change "printing" to --priming--

In column 3, lines 38, 48, 61 and 65, please change "printing" to --priming--

In column 4, lines 9, 15 and 16, please change "printing" to --priming--.

In column 4, line 45, please delete "the", first occurrence.

In column 5, line 7, please change "printing" to --priming--.

In column 5, line 30, please change "hereby" to --herein--.

In column 5, lines 47 and 48, please change "miniature" to --minimum--.

In column 5, line 67, please change "this" to --falls--.

In column 6, line 9, please change "front" to --from--.

In column 6, line 10, please change "4" to --of--.

In column 6, line 24, please change "printing" to --priming--.

In column 6, line 49, please change "printing" to --priming--.

UNITED STATES PATENT AND TRADEMARK OFFICE
CERTIFICATE OF CORRECTION

PATENT NO. : 5,534,161

DATED : July 9, 1996

INVENTOR(S) : Tarr et al.

It is certified that error appears in the above-indentified patent and that said Letters Patent is hereby corrected as shown below:

In column 8, line 17, please change "determined" to —predetermined—.

Signed and Sealed this

Twenty-first Day of January, 1997

Attest:

BRUCE LEHMAN

Attesting Officer   Commissioner of Patents and Trademarks